July 3, 1945. E. J. COLE 2,379,564
APPARATUS FOR FEEDING AND ORIENTING CROWNED NUT OR ARTICLE BLANKS
Filed June 3, 1943 2 Sheets-Sheet 1
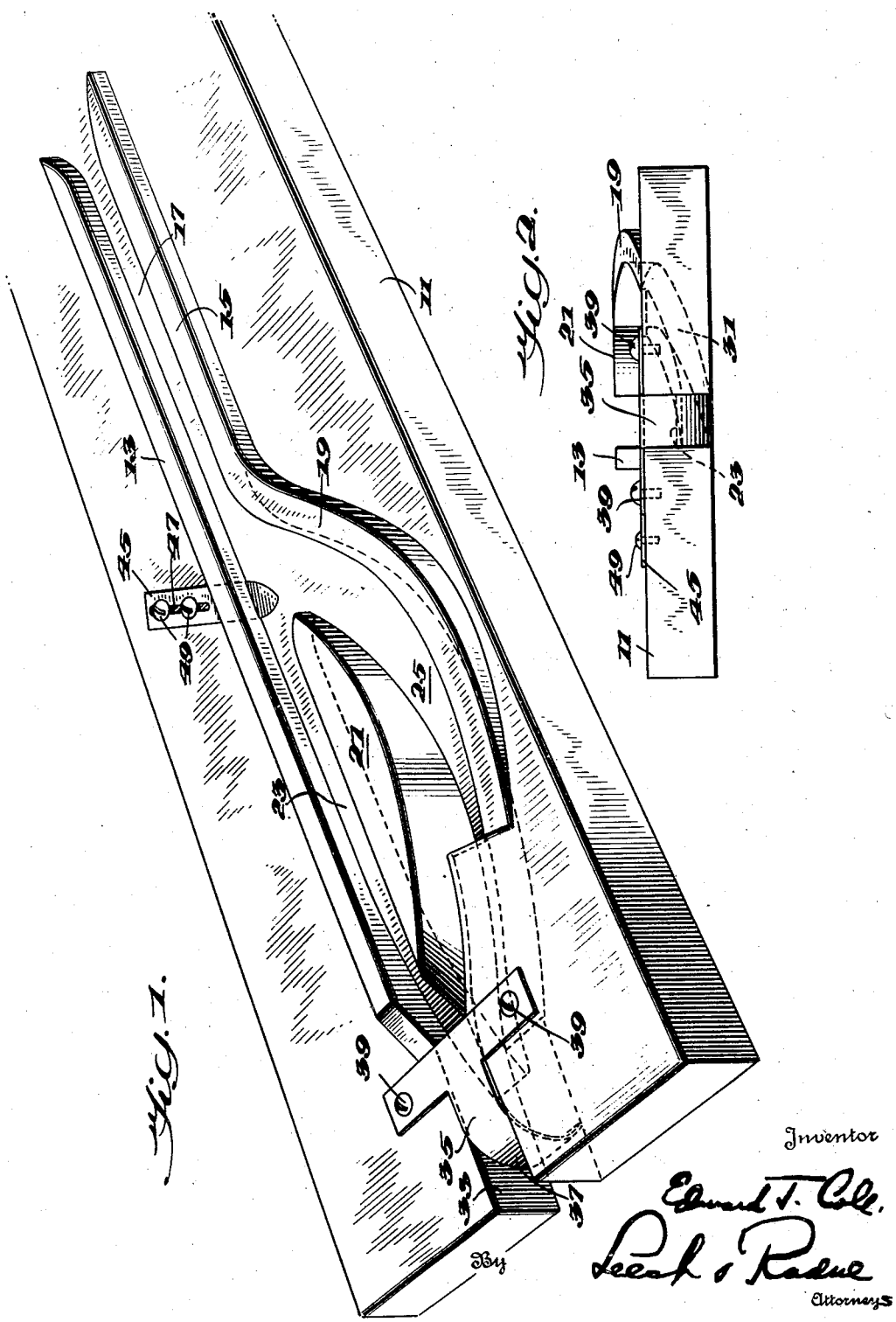

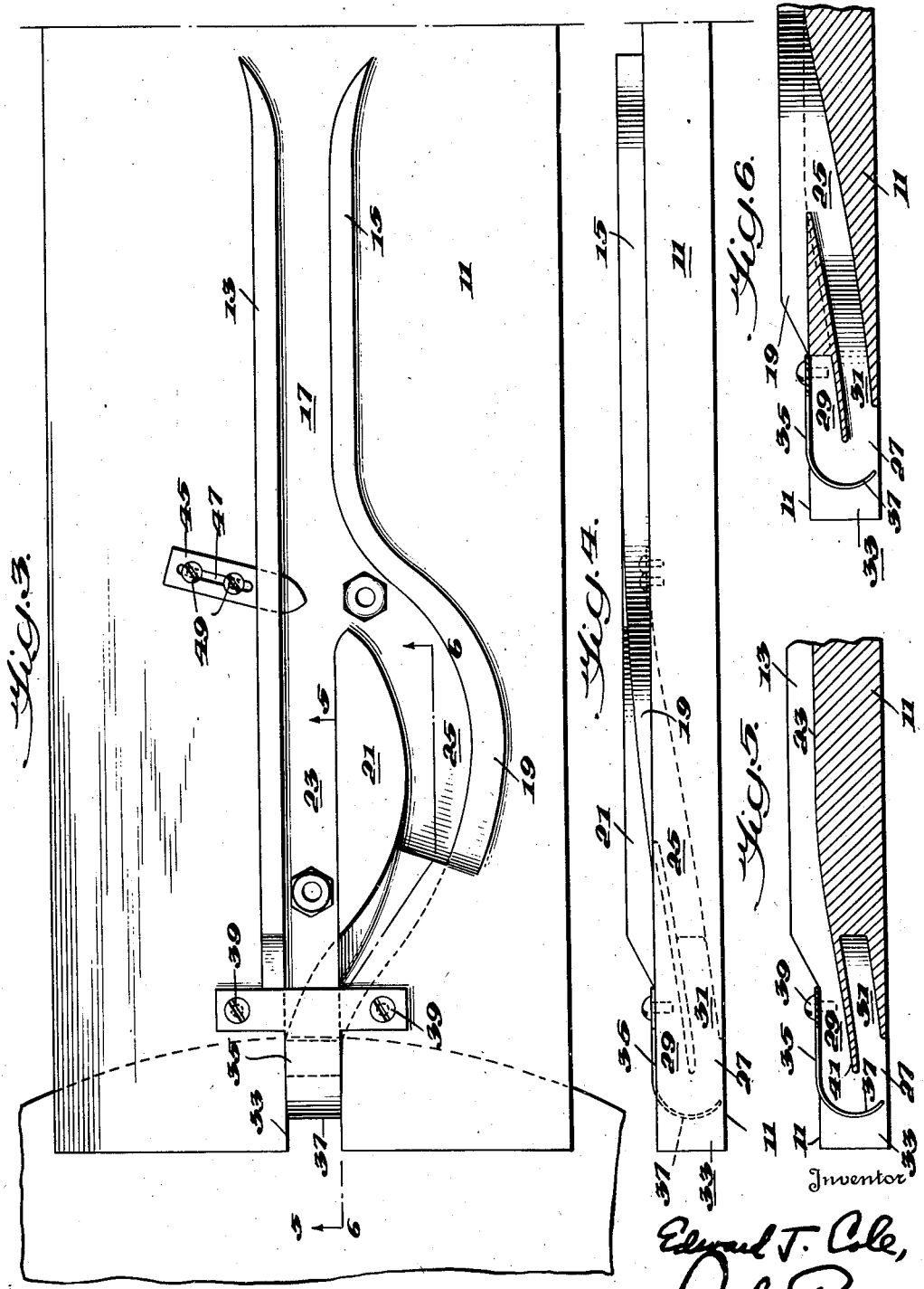

Patented July 3, 1945

2,379,564

UNITED STATES PATENT OFFICE 2,379,564

APPARATUS FOR FEEDING AND ORIENTING CROWNED NUT OR ARTICLE BLANKS

Edward J. Cole, Peekskill, N. Y., assignor to Cole Machinery Mfg. Corp., New York, N. Y., a corporation of New York Application June 3, 1943, Serial No. 489,538

11 Claims. (Cl. 10—165)

This invention relates to a feeding device for crowned article blanks in the course of their manufacture to a finishing machine, and more particularly to a feeding device adapted to orient the blanks so as to deliver them to a finishing machine with the proper face up regardless of the position in which they were received.

Although the apparatus comprising the present invention is well suited for feeding and orienting a great variety of articles having one flat face and an opposite crowned face, it is particularly of value in connection with the manufacture of nut blanks. Formed nut blanks may thus be fed from a hopper, etc., to the present apparatus which delivers them in a uniform position to a receiving or seating tube which may be mounted on or in connection with a tapping, burring or castellating machine or any similar machine.

Apparatus of this general type have been provided heretofore but have been subject to a number of disadvantages. Some of these prior apparatus require elaborate sorting and inverting mechanisms and hence are subject to greater initial cost, maintenance problems, and a greater likelihood of mechanical failure. Other such apparatus provide ejecting mechanisms for improperly positioned blanks which return the same to the original feeding hopper, thus reducing the normal flow of blanks and resulting in a reduced effective capacity of the feeding means. The present invention obviates the above disadvantages by providing a simple and rugged device without moving parts which is capable of feeding and orienting a great variety of types of article blanks in a constant and maximum flow.

Accordingly, it is the chief object of the present invention to provide a feeding mechanism which will enable crowned article blanks to be fed quickly and automatically in an oriented and operative relation to the finishing mechanism.

It is another object of the invention to provide an apparatus for receiving crowned article blanks fed from the hopper in unoriented relationship and cause them to assume the desired uniform or oriented position by their own action under the influence of gravity.

It is a further object to provide a crowned nut, etc., orienting apparatus of maximum capacity which delivers a uniform run or flow of nut blanks from a hopper, etc., to the nut blank receiving tube of an automatic nut or other finishing machine in an oriented position.

It is a further object of the invention to provide an apparatus for separating crown-up nut blanks from crown-down nut blanks in such a manner as to deliver the former to a seated position in the nut receiving tube of the finishing apparatus while simultaneously inverting the latter to a crown-up position for an immediately subsequent seating in the nut receiving tube.

Other objects and advantages of the invention will become apparent during the course of the following description.

In the drawings I have shown one embodiment of the invention. In this showing:

Fig. 1 is a perspective view of the apparatus;

Fig. 2 is a bottom end elevation thereof;

Fig. 3 is a top plan view of the apparatus from the right side;

Fig. 4 is a side elevation thereof;

Fig. 5 is a fragmentary sectional view in elevation on the line 5—5 of Fig. 3; and Fig. 6 is a fragmentary sectional view in elevation taken on the line 6—6 in Fig. 3.

Referring to the drawings, the numeral 11 represents a rectangular base member having integrally formed therewith or suitably secured thereto a pair of guide rails 13 and 15. These guide rails extend longitudinally on the base member 11 and are spaced from each other so as to form a main chute 17. The lower end of guide rail 15 (Fig. 3) terminates in an arcuate portion 19 adjacent the lower end of the base 11. A guide member 21 is positioned between guide rail 13 and arcuate guide rail 19 and equally spaced therefrom so as to form with the former a continuation 23 of main chute 17 and with the latter a second by-pass chute 25. It will be observed that main chute 17, its continuation 23, and arcuate chute 25 are of the same widths and constitute means for feeding nut blanks therealong by gravity when the base member 11 assumes its proper operative and angular position. The base member 11 is provided with a slot 33 of which a portion comprises a discharge opening 27 through which the oriented blanks are passed to the finishing machine. The base 11 is provided with suitable passageways 29 and 31 as continuations of the chutes 23 and 25. It will be apparent from an inspection of Fig. 6 that chute 25 is so arranged as to have a steeper inclination than that of the main chute 17, thus resulting in the termination of chute 25 within and adjacent the bottom of the base 11 at discharge opening 27 as at 31. Likewise (Fig. 5) chute 23 is provided with a greater slope at its lower or left hand portion so as to terminate in passage 29 within and below the surface of the base 11 and directly above discharge opening 27.

In order that crown-down nuts may be oriented, (Fig. 3), a guide and inverting member 35 having an arcuate end portion 37 is positioned within the slot 33 and suitably secured to the base 11 by means of screws 39. A crown nut blank, regardless of whether the crown face is up or down, will on sliding down the inclined chute 29, drop edge first from edge 41 of the passage 29, thus commencing a self rotation of the blank. By means of the cooperating arcuate member 37, a full rotation of 180° will be effected and the blank will drop through discharge opening 27 into the receiving or seating tube (not shown) of the finishing machine.

It will be apparent that a nut blank sliding by gravity down the arcuate chute 25 in crown-up position will arrive by means of passage 31 at the discharge opening 27 and drop into the seating tube without change of its crown-up position.

In order that the crown-up nut or article blanks may be sorted from the crown-down nut blanks, I have provided a diverting blade 45 adjustably and angularly mounted on the base 11. The blade 45 which is mounted at an angle of 60° with the rail 13, is provided with a slot 47 and adjusting screws 49 and projects through or under guide rail 13 into the main chute 17 adjacent the entrance to the by-pass chute 25. The point of this blade is adjusted laterally of the main chute 17 for various sized nut blanks.

The base 11 has an angular operative position with respect to the feed hopper (not shown) and the nut blank receiving or seating tube (not shown) of a finishing mechanism. When arranged in this operative position the longitudinal axis of the base forms an angle of about 30° with the horizontal and the base is also rotated in this inclined plane about its lower left hand edge through an angle of about 25° so that its left edge is lower than its right. This particular angular arrangement insures the proper speed and direction of the nut blanks fed into the main chute 17 which, together with the angular position of the diverting blade 45, further ensures that all crown-up nut blanks proceeding down main chute 17 will be diverted into by-pass chute 25, while conversely, crown-down nut blanks will hug the rail 13 and be permitted to pass the diverting blade and enter chute 23 to be subsequently oriented.

It will be readily apparent (Fig. 1) that a nut blank proceeding by gravity down main chute 17 will be able to proceed over and past the projecting end of the blade 45 and thence down chute 23 to an inverting member 35 if the crown surface is down. This is immediately apparent as the blank has only a spot contact with the surface of the chute when crown down and the chamfered edges permit it to ride up and over the thin edge of the knife blade.

However, should the crown face be up the flat bottom portion of the nut will strike against the blade 45 and, due to the angular position of the blade 45 and its gravitational velocity due to the angular position of the base 11, be diverted into the by-pass chute 25 and thence through the chute 31 into the discharge opening 27.

It will be obvious that the above apparatus may be easily adapted to orient nut or article blanks into either a crown-up position or a crown-down position in the receiving or seating tube of the finishing machine as desired. To deliver the blanks in a crown-down position rather than as above described, it is merely necessary to connect the inverting member 35 to the bottom side of the lip or edge portion 41 so as to cooperate with the end of chute 25 at 31. If desired, the chutes 29 and 31 in the base member 11 can be arranged so that chute 31 terminates above chute 29 rather than as shown in Fig. 5. Such change merely ensures that crown up nut blanks diverted by knife 45 into chute 25 will be inverted whereas crown down nut blanks passing over the blade 45 by reason of the chamfer are permitted to remain in a crown down position.

The present invention thus permits the constant feeding of crowned article blanks in a crown-up or a crown-down position, as desired, to the finishing machine regardless of their position when received from a hopper. Moreover various sizes of blanks may be accommodated by merely changing the width and angularity of the chutes and knife.

It is understood that the form of the invention herein shown and described is to be taken as a preferred example of the same and that various changes in the shape, size, and arrangement of parts may be resorted to without departure from the spirit of the invention or the scope of the subjoined claims.

I claim:

1. A device of the type described comprising an inclined base having a discharge opening therein, a plurality of guide rails forming an open main chute on said base down which articles are adapted to slide by gravity, a by-pass chute intermediate the length of said main chute, means angularly disposed through a guide rail and closely spaced from said base within said open chute for diverting articles having a predetermined position into said by-pass chute for discharge into the opening, and means for giving the balance of said articles the same predetermined position, said base being inclined in two planes whereby said articles will slide along the lower of said rails to engage or pass over said diverting means.

2. A device of the type described comprising an inclined base having a discharge opening therein, a plurality of guide rails forming an open main chute on said said base down which articles are adapted to slide by gravity, a by-pass chute intermediate the length of said main chute, blade means angularly disposed through one of the guide rails and projecting into said open chute for diverting articles having a predetermined position into said by-pass chute for discharge into the opening, and means for giving the balance of said articles the same predetermined position, said last mentioned means comprising an arcuate article inverting member adjacent the lower end of said first mentioned chute.

3. A device of the type described comprising an inclined open gravity main chute and a similar by-pass chute, said by-pass chute branching off from the main chute intermediate its ends and rejoining said main chute adjacent its discharge end, a common bottom discharge opening for both of said chutes in the lower end of said by-pass chute, and an article inverting member adjacent the lower end of said main chute, said member comprising an arcuate band arranged to guide articles into said opening.

4. A device of the type described comprising an inclined gravity main chute and a similar by-pass chute, said by-pass chute branching off from the main chute intermediate its ends and rejoining said main chute adjacent its discharge end, a common bottom discharge opening for both of said chutes in the lower end of said by-pass chute, an article inverting member fixed to and closing the lower end of said main chute, and means extending through said main chute for diverting articles having a predetermined position into said by-pass chute for discharge into the opening.

5. A device of the type described comprising an inclined gravity main chute and a similar by-pass chute, said by-pass chute branching off from the main chute intermediate its ends and rejoining said main chute adjacent its discharge end, a common bottom discharge opening for both of said chutes in the lower end of said by-pass chute, an arcuate article inverting guide member fixed to and closing the lower end of said main chute, and means for diverting articles having a predetermined position only into said by-pass chute for discharge into the opening, said diverting means comprising a blade extending within said main chute adjacent the entrance to said by-pass chute.

6. A device of the type described comprising an inclined gravity main chute and a similar by-pass chute, said by-pass chute branching off from the main chute intermediate its end and rejoining said main chute adjacent its discharge end, a common bottom discharge opening for both of said chutes in the lower end of said by-pass chute, an article inverting member fixed to and closing the lower end of said main chute, and means extending through said main chute for permitting only those articles having a predetermined position to pass down said main chute into said article inverting member for delivery to said opening in an inverted position.

7. A standard nut blank orienting apparatus comprising an inclined gravity main chute and a similar by-pass chute, said by-pass chute branching off from the main chute intermediate its end and rejoining said main chute adjacent its discharge end, a common bottom discharge opening for both of said chutes in the lower end of said by-pass chute, an article inverting member adjacent the lower end of said main chute, and means for permitting only those articles having a predetermined position to pass down said main chute into said article inverting member for delivery to said opening in an inverted position, said means comprising a blade extending within said main chute adjacent the entrance to said by-pass chute.

8. In a device of the type described, an inclined open main chute including sides down which crowned nuts are adapted to slide by gravity, a by-pass chute intermediate the length of said main chute, and means for diverting crowned nuts having a crown-up position into said by-pass chute, said diverting means comprising a blade extending angularly through a side of and within said main chute adjacent the entrance to said by-pass chute and engageable with the base of said crown-up nuts.

9. In a device of the type described, an inclined open main chute including sides down which crowned nuts are adapted to slide by gravity, a by-pass chute intermediate the length of said main chute, means for diverting crowned nuts having a crown-up position into said by-pass chute, said diverting means comprising a blade extending angularly through a side of and within said main chute adjacent the entrance to said by-pass chute and engageable with the base of said crown-up nuts, and means for giving crown-down nuts a crown-up position.

10. In a device of the type described, an inclined open main chute down which crowned nuts are adapted to slide by gravity, a by-pass chute intermediate the length of said main chute, means for diverting crowned nuts having a crown-up position into said by-pass chute, said diverting means comprising a blade extending within said main chute adjacent the entrance to said by-pass chute and engageable with the base of said crown-up nuts, and means for giving crown-down nuts a crown-up position, said last named means comprising an arcuate nut inverting member adjacent the lower end of said main chute.

11. A device of the type described comprising an inclined gravity main chute and a similar by-pass chute, said by-pass chute branching off from the main chute intermediate its ends and rejoining said main chute adjacent its discharge end, a common bottom discharge opening for both of said chutes in the lower end of said by-pass chute, a crowned nut inverting member adjacent the lower end of said main chute, and means for diverting crown-up nuts into said by-pass chute for discharge into said opening, said diverting means comprising a blade extending angularly within said main chute adjacent the entrance to said by-pass chute and engageable with the base of crown-up nuts.

EDWARD J. COLE.